United States Patent
Jagodik et al.

(10) Patent No.: US 7,433,912 B1
(45) Date of Patent: Oct. 7, 2008

(54) MULTIPLIER STRUCTURE SUPPORTING DIFFERENT PRECISION MULTIPLICATION OPERATIONS

(75) Inventors: Paul J. Jagodik, Austin, TX (US);
Jeffrey S. Brooks, Austin, TX (US);
Christopher Olson, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 737 days.

(21) Appl. No.: 10/782,162

(22) Filed: Feb. 19, 2004

(51) Int. Cl.
*G06F 7/533* (2006.01)
(52) U.S. Cl. .................................... 708/628
(58) Field of Classification Search ............... 708/625, 708/628
See application file for complete search history.

(56) References Cited

U.S. PATENT DOCUMENTS

| | | | |
|---|---|---|---|
| 4,953,119 A * | 8/1990 | Wong et al. ............... | 708/513 |
| 5,450,607 A | 9/1995 | Kowalczyk et al. | |
| 5,487,022 A | 1/1996 | Simpson et al. | |
| 5,636,351 A | 6/1997 | Lee | |
| 5,669,010 A | 9/1997 | Duluk, Jr. | |
| 5,673,407 A | 9/1997 | Poland et al. | |
| 5,675,526 A | 10/1997 | Peleg et al. | |
| 5,761,103 A | 6/1998 | Oakland et al. | |
| 5,809,292 A * | 9/1998 | Wilkinson et al. ......... | 712/222 |
| 5,867,415 A | 2/1999 | Makino | |
| 5,867,724 A | 2/1999 | McMahon | |
| 6,035,318 A * | 3/2000 | Abdallah et al. ........... | 708/628 |
| 6,202,077 B1 | 3/2001 | Smith | |
| 6,243,728 B1 | 6/2001 | Farooqui et al. | |
| 6,631,392 B1 | 10/2003 | Jiang et al. | |
| 6,714,197 B1 | 3/2004 | Thekkath et al. | |
| 7,043,518 B2 * | 5/2006 | Simon et al. ................ | 708/523 |
| 7,099,910 B2 | 8/2006 | Brooks et al. | |
| 2002/0042805 A1 * | 4/2002 | Ferroussat .................. | 708/628 |

* cited by examiner

*Primary Examiner*—David H Malzahn
(74) *Attorney, Agent, or Firm*—Dorsey & Whitney LLP

(57) ABSTRACT

A unified data flow is provided that allows multiplication of SIMD and non-SIMD multiplies in one multiplier. The multiplies may be both integer and floating point operations. The multiplier is partitionable having a plurality of sub-trees. The multiplier is configured to be a single tree structure in response to a non-SIMD multiplication instruction and as a partitioned tree structure in response to a SIMD multiplication instruction. At least two multiplication operations can be performed in parallel in the partitioned tree structure in response to the SIMD multiplication instruction and a single multiplication operation is performed in the single tree structure in response to the non-SIMD multiplication instruction. Appropriate formatting of the input operands and selection of data from the tree structures is performed in accordance with the instruction.

21 Claims, 8 Drawing Sheets

MULTIPLIER STRUCTURE SUPPORTING DIFFERENT PRECISION MULTIPLICATION OPERATIONS

BACKGROUND

1. Field of the Invention

This application relates arithmetic structures in computer systems and more particularly to structures utilized in multiplication operations.

2. Description of the Related Art

Computer architectures may include many different types of multiply instructions with various input and output data precision. For example, single instruction multiple data (SIMD) multimedia instructions are typically implemented using partitioned input and output data. Also, in the same implementation, architectures are demanding large 64 bits multiplies.

Conventional floating point units (FPUs) support many data flows customized to a specific multiply instruction to create the best possible performance. By increasing the number of types of multiply data flows implemented independently in a micro-architecture causes the area, power, and costs to grow.

Many multimedia instruction set architectures define several signed and unsigned integer and single precision floating point instructions, which execute as a SIMD (single instruction, multiple data) operation, producing various precision results in parallel.

It would be desirable to implement the various multiplies required by a particular architecture in a single multiplier structure to provide a better area, power, and cost tradeoff for a performance level.

SUMMARY

Accordingly, an embodiment of the invention provides for execution of SIMD and non-SIMD multiplies in one multiplier to save area, power, and cost with minimal impact on instruction latency and performance. The multiplies may be both integer and floating point operations.

In one embodiment, the invention provides a multiplication unit that includes a partitionable multiplier structure partitionable into two or more sub-tree structures. The multiplication unit responds to an indication of a first instruction type to configure the multiplier structure into the two or more sub-trees structure to perform multiple multiplication operations in parallel. The multiplication unit responds to an indication of a second instruction type to configure the sub-tree structure into a single data flow to perform a single multiplication operation.

In another embodiment, a method is provided for performing a multiplication operation using a partitionable data flow structure having a plurality of sub-trees. The method includes formatting one or more first operands, according to an instruction decode, by formatting at least a least significant bit in each data partition, each data partition corresponding to a sub-tree, that is adjacent to another data partition corresponding to another sub-tree. A second operand is supplied to each sub-tree of the partitionable multiplier structure; and the formatted one or more first operands are used to generate control signals for encoding the second operands to provide partial products supplied in each sub-tree.

In another embodiment, a method is provided for performing multiplication operations that includes configuring a partitionable tree structure to be a single tree structure in response to a first multiplication instruction decode and as a partitioned tree structure in response to a second multiplication instruction decode; and performing at least two multiplication operations in parallel in the partitioned tree structure in response to the second multiplication instruction decode and performing a single multiplication operation in the single tree structure in response to the first multiplication instruction decode.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

FIG. 7 illustrates the use of the multiplier structure for four 16 bit multiplies.

FIG. 8 illustrates the use of the multiplier structure for two 32 bit multiplies.

FIG. 9 illustrates the use of the multiplier structure for a 64 bit multiply.

DESCRIPTION OF THE PREFERRED EMBODIMENT(S)

Figure 1:
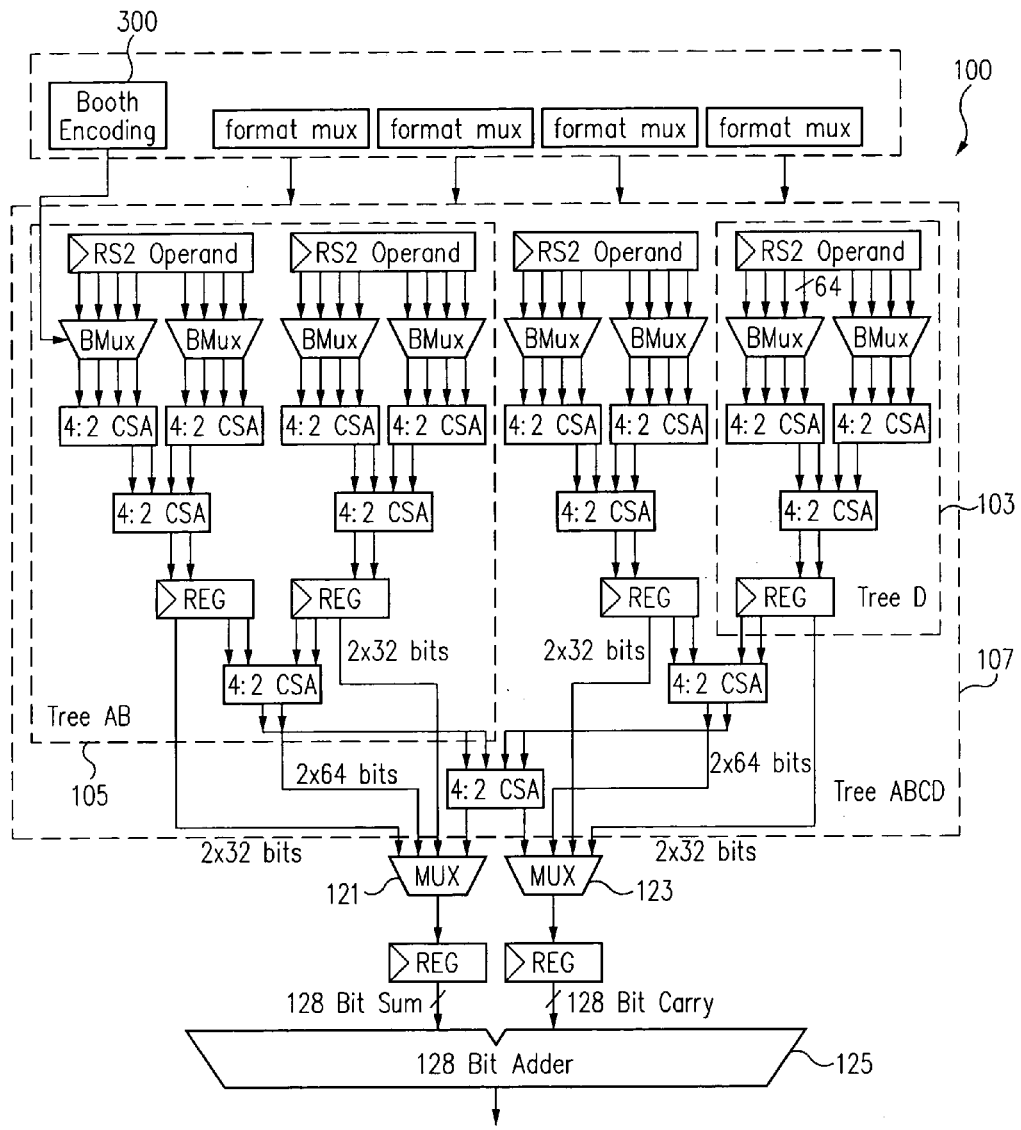
FIG. 1 illustrates various ways to partition a multiplier structure in accordance with an embodiment of the invention to support multiple multiplication operations.

Referring to FIG. 1, illustrated are the various ways that a partitionable multiplier structure can be configured according to one embodiment of the invention that supports both SIMD and non-SIMD instructions. The multiplier structure 100 can be partitioned into multiple partitions for SIMD multiplies and into a single data flow for non-SIMD (e.g., a scalar type) multiply instructions. In the exemplary embodiment illustrated in FIG. 1, the partitionable structure 100 can be partitioned into a maximum of four equally sized partitions, each partition being similar to tree D, partition 103. In other embodiments, the maximum number of partitions may be greater than or less than four. When configured into four partitions for execution of SIMD multiply instructions, the data flow can accommodate four multiplications executed concurrently. Additionally, the four partitions can operate on independent data. The partitionable tree structure can also be configured into two partitions, each similar to tree AB, partition 105, which can be used to multiply 32 bit data. When the four partitions are combined (tree ABCD) the single data flow 107 can multiply 64 bit data for non-SIMD instructions. In one embodiment, a different SIMD or scalar type instruction can be executed every cycle by the partitionable structure.

Figure 2:
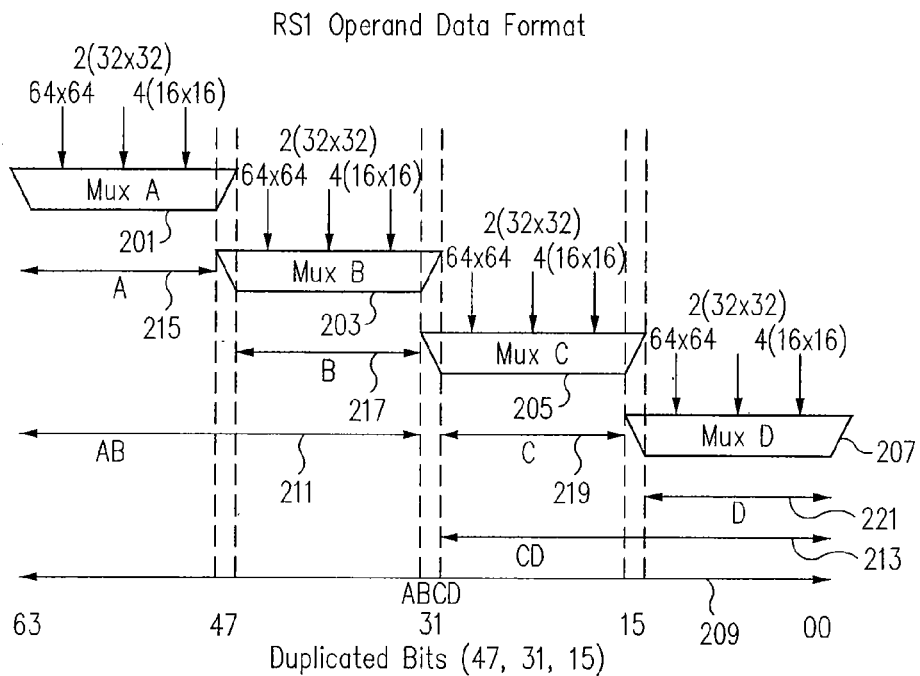
FIG. 2 illustrates an operand data format in accordance with an embodiment of the invention.

In addition to partitioning into the various trees, the multiplier structure 100 includes a format stage in order to support the partitioning. That is, the input operands are specially formatted to enable the sharing of hardware in the partitionable multiplier structure 100. FIG. 2 illustrates how an input operand, referred to herein as the RS1 operand for convenience, is formatted to create a Booth encoding operand. As is well known in the art, Booth encoding (also referred to as recoding) is utilized to more efficiently multiply data by reducing the number of partial products generated and therefore reducing the number of additions that need to be performed in the multiplier.

In a conventional multiply operation, a partial product is generated for each bit in the multiplier, which are then summed. With binary arithmetic, the multiplier is either a one or a zero, so each partial product is either the multiplicand (1× multiplicand) or 0 (0× multiplicand). The maximum number of partial products that need to be added corresponds to the number of non-zero bits in the multiplier. Booth encoding reduces the number of partial products utilizing multiple bits to determine each partial product. Booth encoding typically uses two current bits as well as the MSB of the previous two bits to determine the partial product. FIG. 2 illustrates the formatting of the multiplier (or Booth operand) used to generate the Booth encoding as it is formatted for the different types of multiplies. For convenience, the multiplier will be referred to as the RS1 operand.

Figure 3:
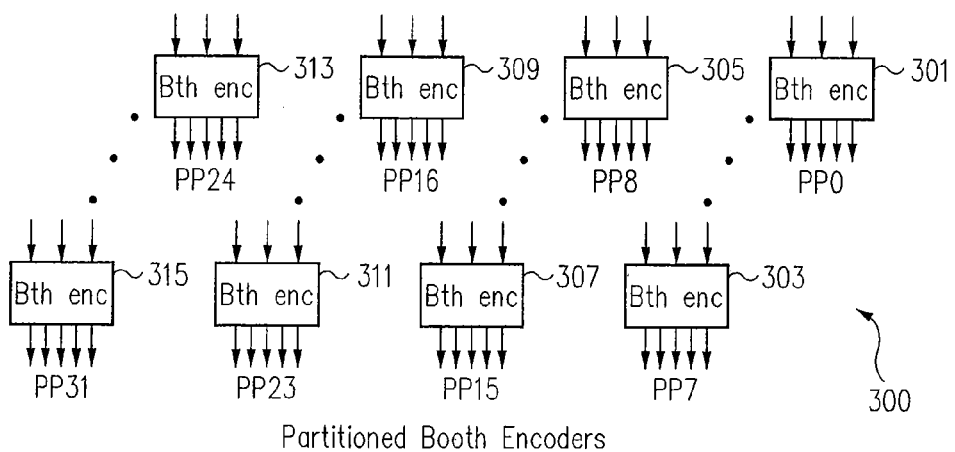
FIG. 3 illustrates Booth encoded selects according to an embodiment of the invention.

Referring to FIG. 2, four multiplexers 201, 203, 205, and 207 are illustrated that are utilized to format the RS1 operand according to the type of instruction that is being decoded. Thus for 64 bit non-SIMD multiply instructions the operand will span the whole RS1 register as indicated by 209 showing that the partitionable structure is a single data flow (tree ABCD). FIG. 3 illustrates the partitioned Booth encoder. Booth encoders 301 and 303 are the first and last encoders utilized by tree D. Booth encoders 305 and 307 are the first and last encoders utilized by tree C. Booth encoders 309 and 311 are the first and least encoders utilized by tree B. Booth encoders 313 and 315 are the first and last encoders utilized by tree D. The partial product controlled by each Booth encoder is indicated in FIG. 3. For example, Booth encoder 301 generates partial product 0 (PP0) and Booth encoder 315 generates partial product 31 (PP31). For the case of a 64 by 64 bit multiply, the 32 partial products (PP0 to PP31) are summed to generate the result.

For SIMD instructions, the multiple data will be partitioned and formatted into the booth encoder. To avoid data from corrupting a neighboring booth encoder data, a duplicated bit will have to be generated. The duplicated bits will be on the edges of each partitioned sub-tree structure. These edge bits are 47, 31, and 15 as indicated in FIG. 2. Depending on the instruction type the data value of these duplicated bits could be identical, zero, or a sign extension bit. For SIMD instructions having 32 bit multiplies, the operands spanning trees AB 211 and CD 213 are provided to the Booth encoder partitioned for two operands with bit 31 provided to Booth encoder 309 being zeroed out. For SIMD instructions having 16 bit multiplies, the operands spanning trees A 215, B 217, C 219, and D 221, are provided to the Booth encoder partitioned for four operands with bit 15 (provided to Booth encoder 305), bit 31 provided to Booth encoder 309, and bit 47 provided to Booth encoder 313 being zeroed out to ensure that a bit from one partition operand does not corrupt an adjacent operand. Remember that for the non-partitioned utilization of the Booth encoders, encoders 305, 309 and 313 receive as the LSB a bit associated with an adjacent sub-tree that represents the MSB of the previous two bits. When the partitionable structure is partitioned, that bit needs to be zero.

In other contexts, for example when the partition is for four sixteen bit multiplies, an instruction may specify a signed multiplication with one or both of the operands being less than 16 bits. In such circumstances, the bits supplied to, e.g., Booth encoder 303 may require sign extension. Thus, the formatting performed by multiplexers 201-207 and any additional formatting logic for sign extension that is not explicitly shown, is dependent upon the instruction decode. The instruction decode specifies whether a non-SIMD scalar type multiplication (e.g. 64 bit operands) or a SIMD multiplication (e.g. 32 or 16 bit operands). The instruction decode may specify, e.g., a double precision multiplication operation, a single precision operation, an integer multiply, and may specify whether the operation is signed or unsigned. Thus, e.g., the instruction decode can specify whether sign extension is required because of a signed multiply having an operand used for the Booth encoding that is less than 16 bits.

Figure 4:
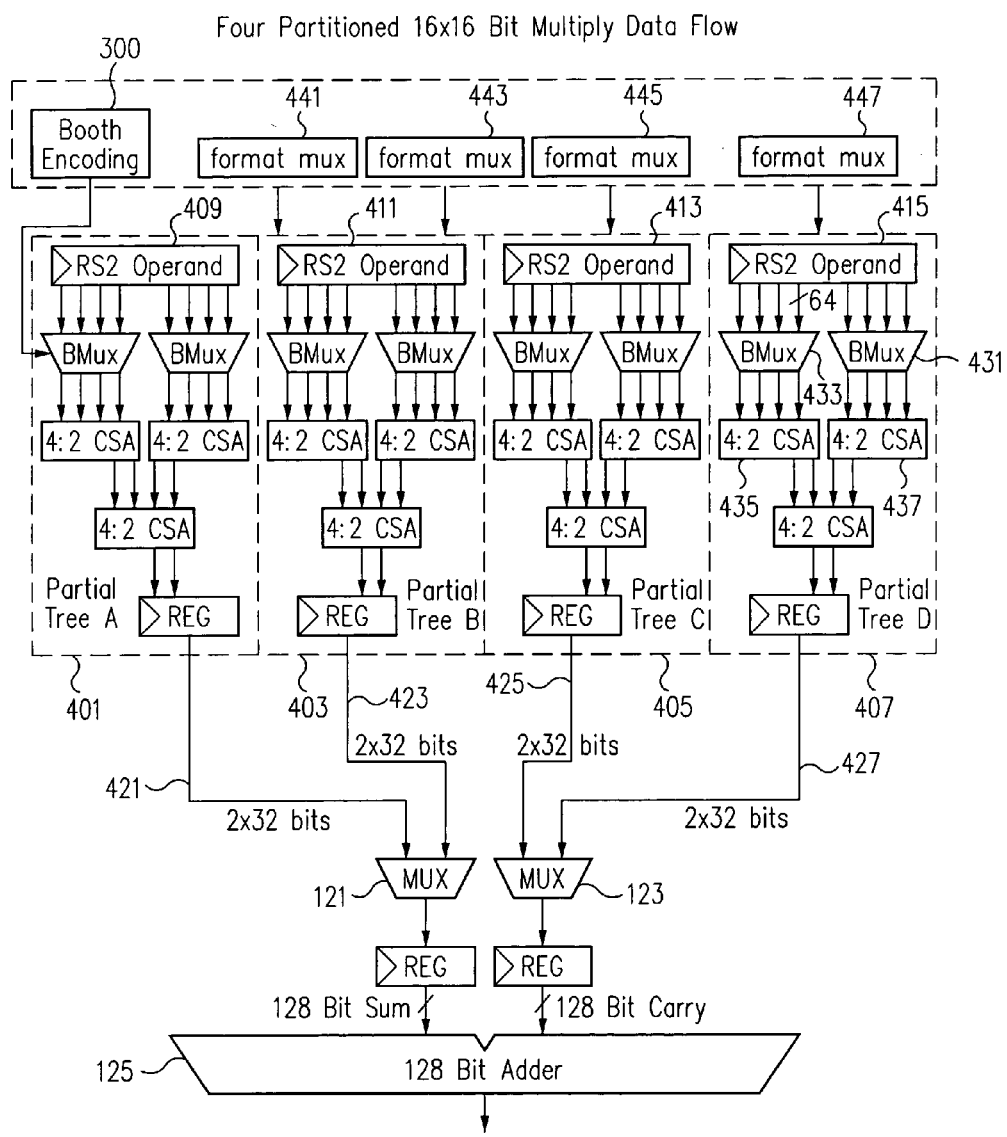
FIG. 4 illustrates a partitioned multiplier providing for four partitioned 16 bit multiplies according to an embodiment of the invention.

Referring to FIG. 4, an embodiment is illustrated in which the partitionable data flow is partitioned into four sub-trees 401, 403, 405, and 407, which provide for four sixteen bit multiplies in parallel. Thus, a SIMD multiply is performed by partitioning the data flow tree into four sections and formatting the input and output data appropriately. Note that the non-Booth operand, designated as RS2 herein, is duplicated in register 409, 411, 413 and 415 for each sub-tree. Duplicating the register in each sub-tree allows a partitioned operand data type to enter the multiplier tree. The registers each support 64 bit multiplications and thus are wider than needed for 16 or 32 bit multiplies. Input multiplexers 441, 443, 445, and 447 supply respective RS2 registers with appropriately formatted RS2 data. The selects for the multiplexers will be generated based on the instruction type or decode. For example, for signed sixteen bit multiplies, the data supplied to the RS2 registers will be sign extended. For unsigned multiplies, the RS2 registers may be zeroed out above sixteen bits. In one embodiment the precision and sign of the RS1 and/or RS2 operands may vary for data specified by the SIMD instruction. Note that RS1 data may also be formatted appropriately to reflect signed and/or unsigned operations.

Figure 5:
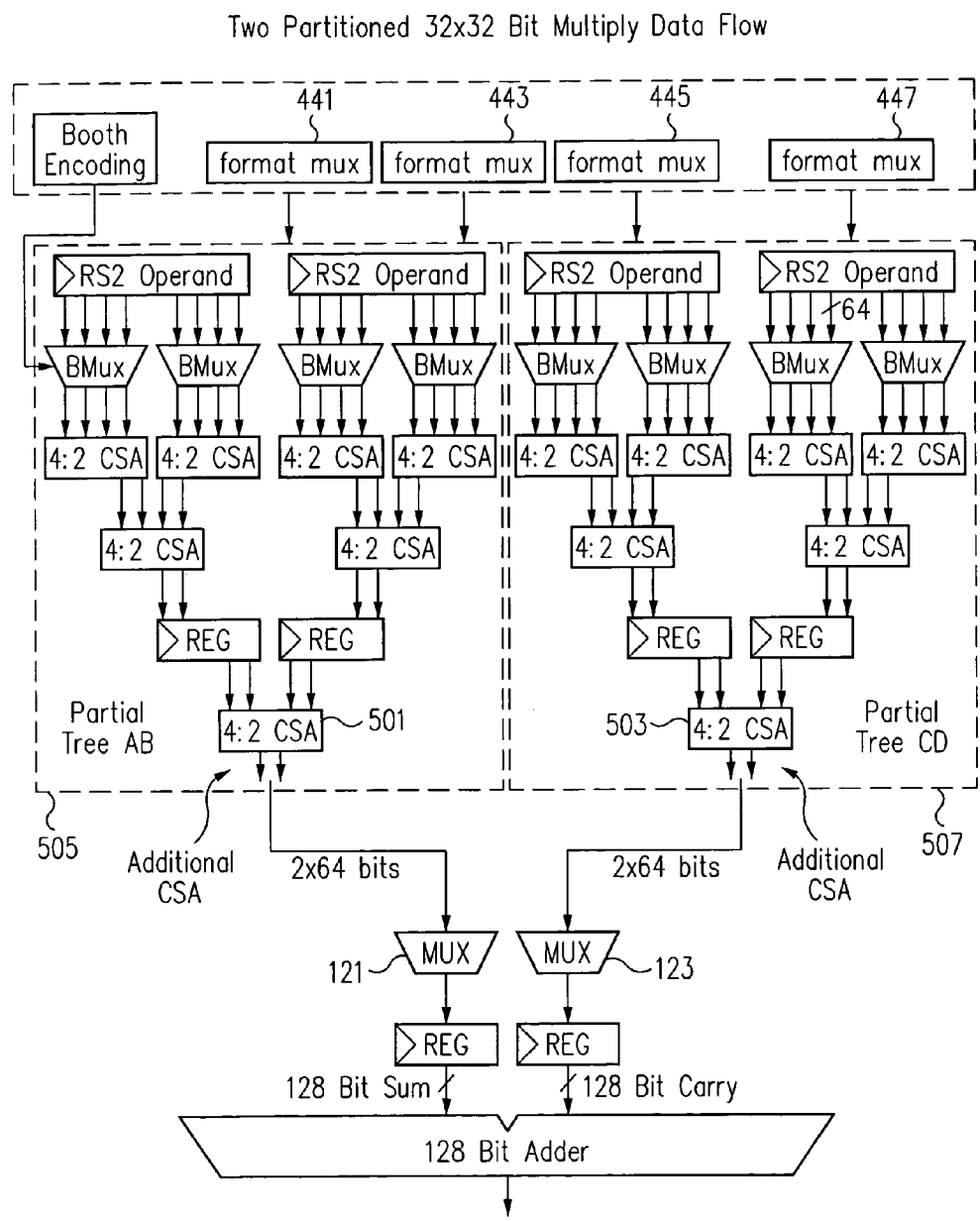
FIG. 5 illustrates a partitioned multiplier providing for two partitioned 32 bit multiplies according to an embodiment of the invention.
Figure 6:
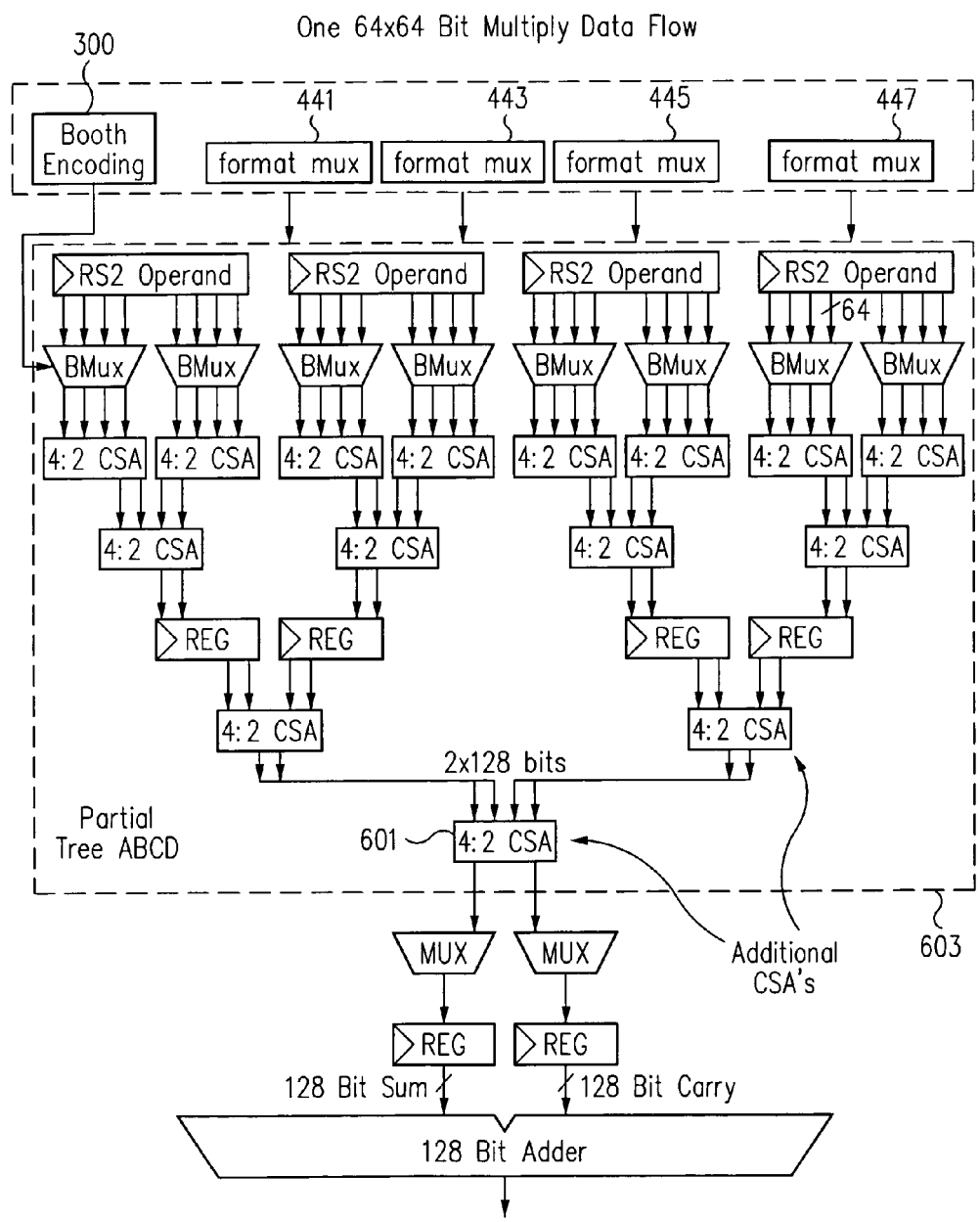
FIG. 6 illustrates a partitionable multiplier structure configured for a 64 bit multiply according to an embodiment of the invention.

A 16 bit operand multiplied by a 16 bit operand will produce a 32 bit result. The four multiplication results are supplied in sum and carry representation on nodes 421, 423, 425 and 427. Those results are supplied to and selected by multiplexers 121 and 123 when the instruction specifies 16 bit SIMD operations. Thus, the instruction decode determines the multiplexer selects for multiplexers 121 and 123. Note that FIG. 1 shows all the data that is selectable being supplied to multiplexers 121 and 123, while FIGS. 4-6 show only the data being utilized in the particular embodiment being supplied to the multiplexer, thus implicitly showing the multiplexer selection control. Note that the adder 125 can be used to place the result in non-redundant representation (as opposed to sum and carry). The adder needs to ensure that additions performed for four 16 bit multiply results are performed independently. That is, carries from one result should not affect an adjacent result. That may be accomplished, for example, by suppressing carries or spacing the data for each multiply result with a bit between the results.

FIG. 5 illustrates how the tree structure illustrated in FIG. 1 is partitioned to multiply two partitioned 32 bit data values. By adding an additional level of carry-save-adder (CSA), shows as CSAs 501 and 503, and appropriately formatting the input operands and appropriately selecting the output data, the Wallace tree structure can multiply two partitioned 32 bit values. The data flow is shown as Wallace tree AB 505, and tree CD 507. The two multiplication results are supplied by CSA's 501 and 503. Those results are selected by multiplexers 121 and 123 with the selects being determined according to the type of instruction being executed.

FIG. 6 illustrates how the tree structure illustrated in FIG. 1 is utilized to multiply 64 bit data value. By adding an additional level of carry-save-adder (CSA) 601, the Wallace tree can multiply two 64 bit values. The data flow is shown as Wallace Tree ABCD 603.

The output format multiplexer has to take data from different stages of the Wallace tree depending on the output precision of the result. For example, for 16 bit multiples, the output format bypasses any additional carry-save-adders which would corrupt the final result data.

Figure 7:
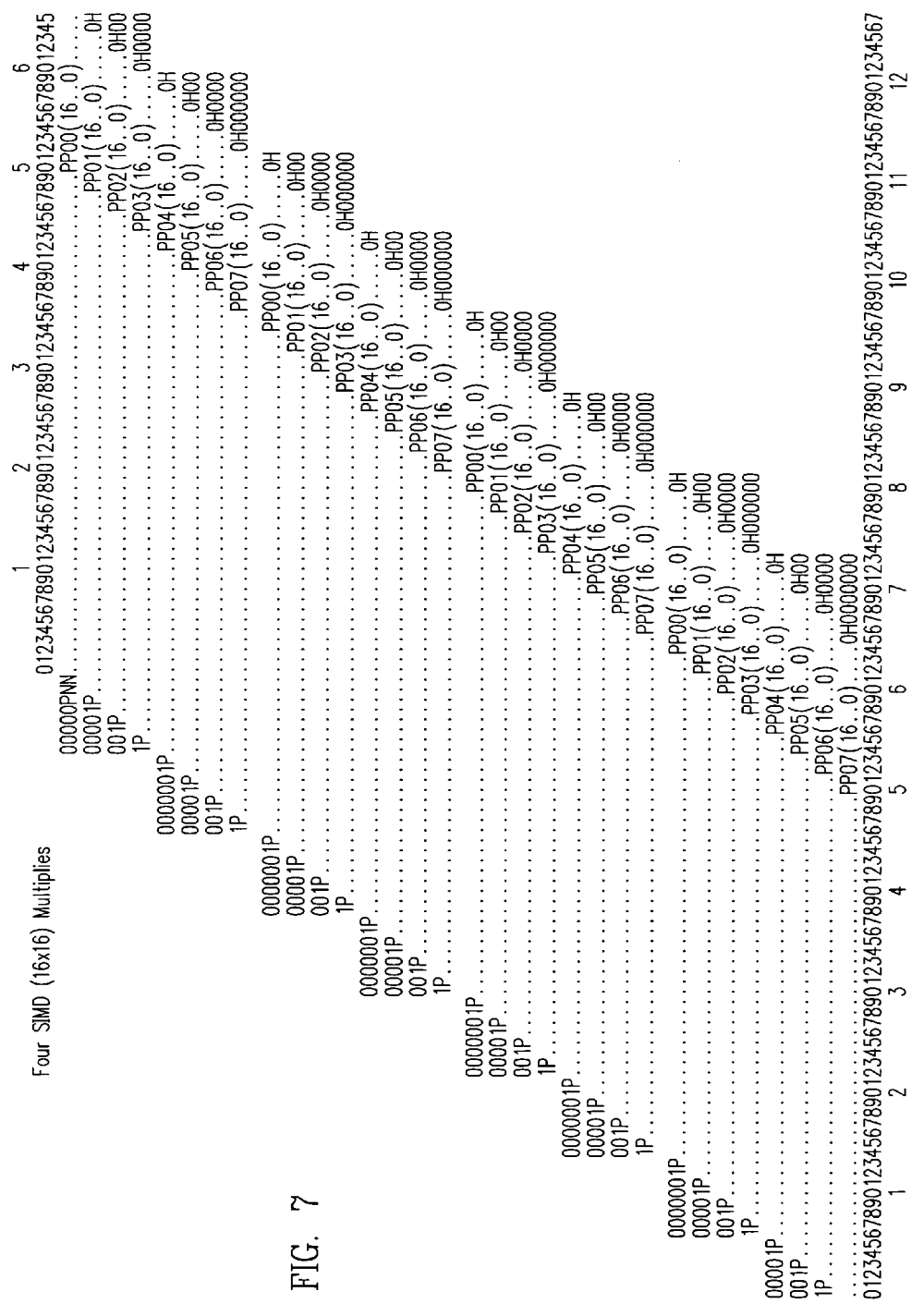
Figure 8:
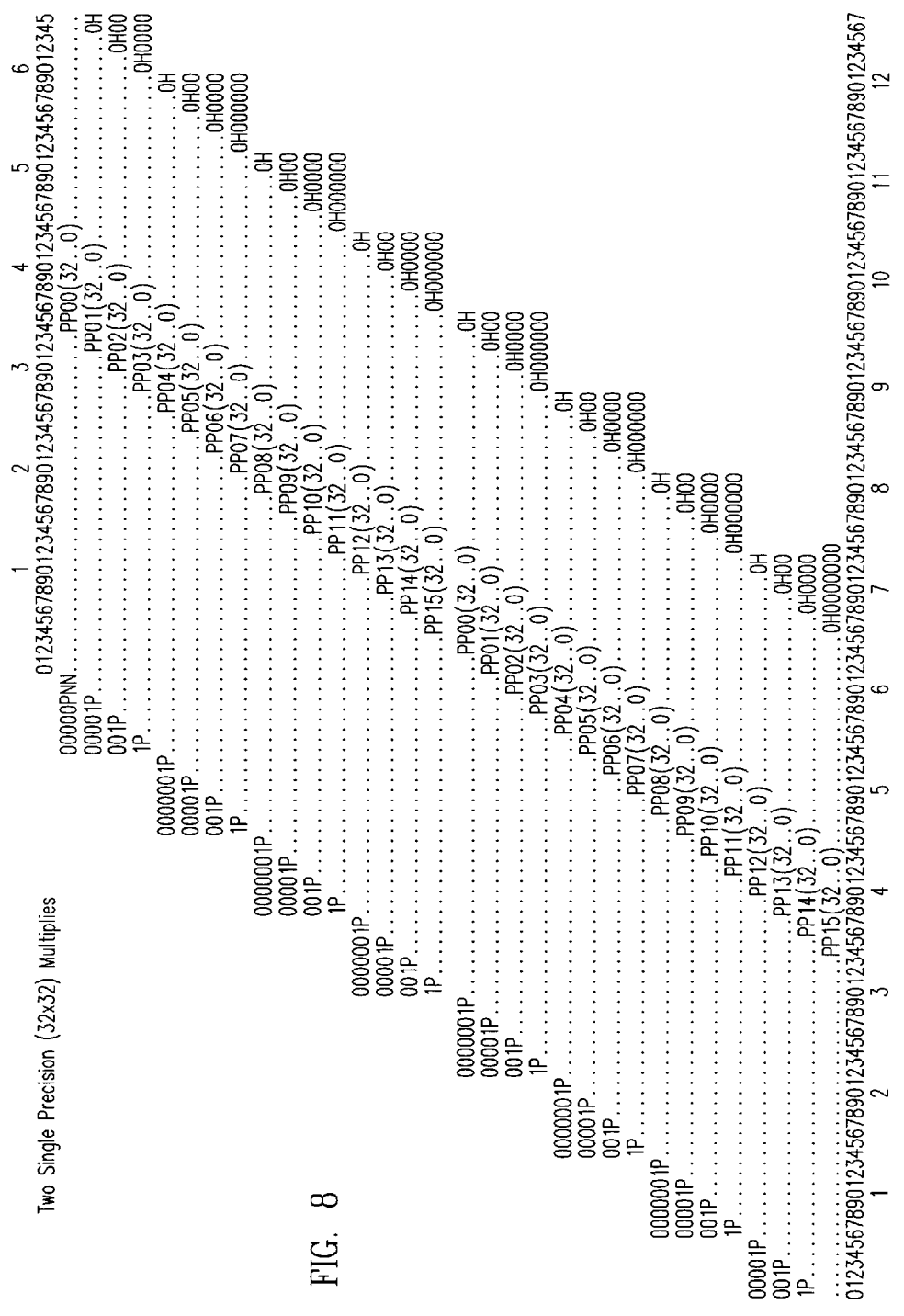
Figure 9:
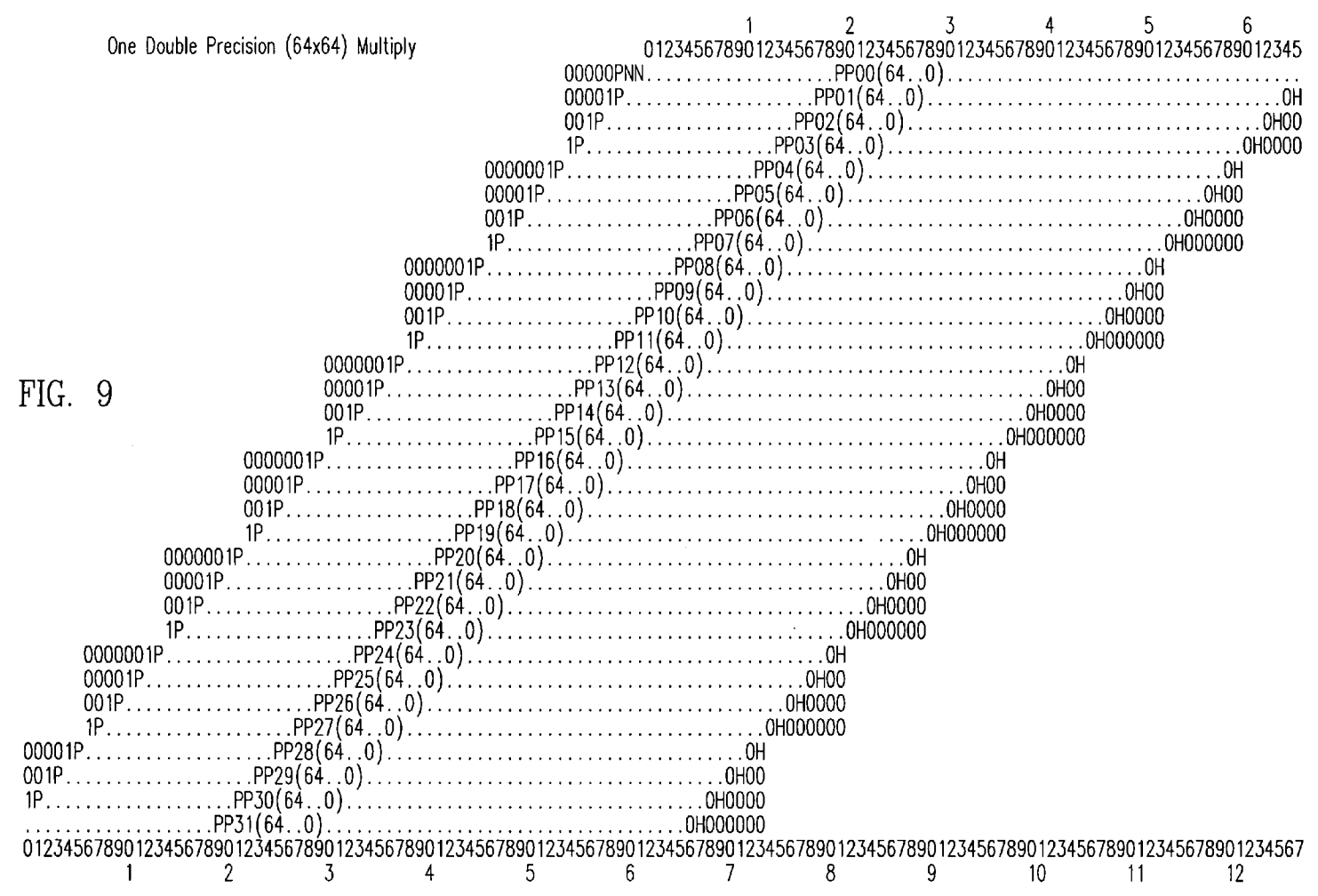

The utilization of the partitionable multiplier structure is further illustrated in FIGS. 7-9. FIG. 7 illustrates how the Wallace tree or carry save adder structures are utilized for four 16 bit multiplies. Referring to FIGS. 4 and 7, the partial products PP00 through PP07 are supplied by Booth multiplexers (represented symbolically by multiplexers 431 and 433) to CSAs 435 and 437. FIG. 8 illustrates how the structures are utilized for two 32 bit multiply operations and FIG. 9 illustrates how the Wallace tree structure is utilized for a 64 bit multiply operation.

The embodiments described above are presented as examples and are subject to other variations in structure and implementation within the capabilities of one reasonably skilled in the art. The details provided above should be interpreted as illustrative and not as limiting. Variations and modifications of the embodiments disclosed herein, may be made based on the description set forth herein, without departing from the scope of the invention as set forth in the following claims.

What is claimed is:

1. A multiplication unit comprising:
a partitionable multiplier structure partitionable into two or more sub-tree structures, the multiplication unit responsive to an indication of a first instruction type to be partitioned into the two or more sub-trees structure to perform multiple multiplication operations in parallel, and responsive to an indication of a second instruction type to configure the subtree structures into a single data flow to perform a single multiplication operation;
an input format stage coupled to receive one or more first input operands and to format the one or more first input operands according to a type of multiply operation being performed;
an encoder circuit coupled to receive the one or more formatted first input operands and supply control signals to multiplexer circuits used in generating partial products in the partitioned sub-tree structure; and
wherein the input format stage formats bits corresponding to edges of each partitionable sub-tree structure according to the instruction type specifying the multiply operation being performed.

2. The multiplication unit as recited in claim 1 wherein the first instruction type is a single instruction multiple data (SIMD) instruction and the second instruction is a non-SIMD instruction.

3. The multiplication unit as recited in claim 2 wherein the SIMD and nonSIMD multiplication operations include at least one of floating point and integer multiplication.

4. The multiplication unit as recited in claim 1 wherein the formatted bits are formatted to be one of, identical to an adjacent bit, zero, or sign extended according to the instruction type.

5. The multiplication unit as recited in claim 1 wherein each partitioned subtree comprises:
a storage location storing a second input operand;
first selector circuits coupled to the storage location supplying the second input operand according to control signals received from the encoder circuit;
a plurality of adder circuits coupled in a tree structure and coupled to receive portions of partial products encoded according to the encoding circuit; and
second selector circuits coupled to particular portions of the sub-trees to select outputs from the sub-trees according the instruction type.

6. The multiplication unit as recited in claim 5 wherein each storage location is capable of storing an independent second input operand for SIMD operations.

7. The multiplication unit as recited in claim 1 wherein the multiplication unit is included on a processor.

8. A computer-readable medium encoded with instructions that, when executed, perform a multiplication operation using a partitionable data flow structure having a plurality of sub-trees by:
formatting one or more first operands by formatting at least a least significant bit in each data partition, each data partition corresponding to a subtree, that is adjacent to another data partition, according to an instruction decode;
supplying a second operand to each sub-tree of the partitionable multiplier structure;
supplying the formatted one or more first operands to generate control signals for encoding the second operands to provide partial products supplied in each sub-tree;
configuring the partitionable data flow structure to be a single tree structure in response to a first multiplication instruction decode and as a partitioned tree structure in response to a second multiplication instruction decode;
performing at least two multiplication operations in parallel in the partitioned tree structure in response to the second multiplication instruction decode and performing a single multiplication operation in the partitionable tree structure in response to the first multiplication instruction decode.

9. The computer-readable medium as recited in claim 8 wherein the partitionable data flow structure functions as a single tree structure when the instruction decode specifies a non-SIMD multiplication operation and as a partitioned tree structure when the instruction decode specifies a SIMD instruction.

10. The computer-readable medium as recited in claim 9 wherein the SEAD and non-SIMD multiplication operations include at least one of floating point and integer multiplication.

11. The computer-readable medium as recited in claim 9 wherein the encoding utilized is Booth encoding.

12. The computer-readable medium as recited in claim 8 wherein the second operand supplied to each sub-tree is the same second operand.

13. The computer-readable medium as recited in claim 8 wherein the second operand supplied to each sub-tree is a different second operand.

14. The computer-readable medium as recited in claim 8 further comprising selecting outputs from different locations in the sub-trees according to the instruction decode to form the multiplication result.

15. The computer-readable medium as recited in claim 8 wherein the formatted least significant bit is formatted to be one of, identical to a bit in an adjacent data partition, zero, or sign extended according to the instruction type.

16. The computer-readable medium as recited in claim 8 further comprising selectively performing one multiplication operation for a non-SIMD instruction in the partitionable data flow structure and performing at least two multiplication operation simultaneously in the partitionable tree structure for SIMD instructions.

17. A computer-readable medium encoded with instructions that, when executed, perform multiplication operations by:

configuring a partitionable tree structure to be a single tree structure in response to a first multiplication instruction decode and as a partitioned tree structure in response to a second multiplication instruction decode;

receiving one or more first input operands and formatting bits of the one or more first input operands corresponding to edges of each partitionable sub-tree structure according to the first multiplication decode or the second multiplication decode specifying the multiply operation being performed;

supplying control signals to multiplexer circuits used in generating partial products in the partitioned sub-tree structure; and performing at least two multiplication operations in parallel in the partitioned tree structure in response to the second multiplication instruction decode and performing a single multiplication operation in the partitionable tree structure in response to the first multiplication instruction decode.

18. The computer-readable medium as recited in claim 17 wherein the first multiplication instruction decode is a non-SIMD instruction and the second multiplication instruction decode is a SIMD instruction.

19. The computer-readable medium as recited in claim 18 further comprising formatting a Booth operand according to the instruction decode to prevent data associated with a sub-tree from corrupting a neighboring sub-tree when the partitionable tree structure is partitioned in response to the SIMD instruction decode.

20. The computer-readable medium as recited in claim 19 wherein a bit supplied to a Booth encoder at a boundary of a sub-tree is set to zero when the partitionable tree structure is partitioned for a SE WD instruction and for a non-SIMD instruction takes on a data value utilized by a neighboring sub-tree.

21. The computer-readable medium as recited in claim 19 further comprising providing a register in each sub-tree for the non-booth operand.

* * * * *